Sept. 23, 1924.   1,509,815
J. C. DAWSON
LOOSE LEAF BINDER
Filed March 8, 1923   2 Sheets-Sheet 1

Inventor:
James C. Dawson
By
Gillson & Mann
Attys.

Sept. 23, 1924.  
J. C. DAWSON  
LOOSE LEAF BINDER  
Filed March 8, 1923  
1,509,815  
2 Sheets-Sheet 2
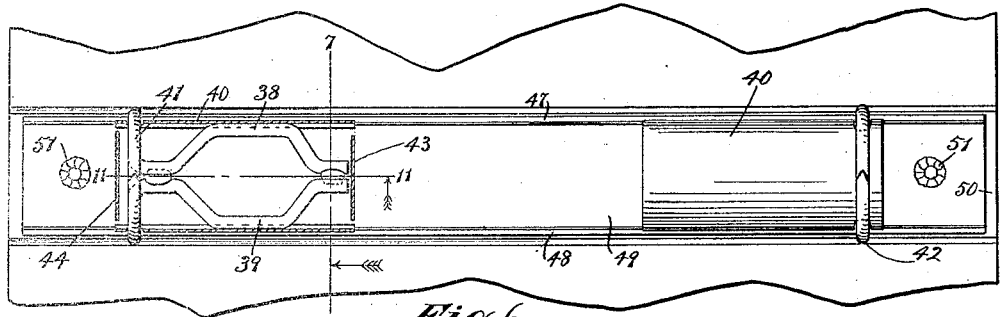
Fig. 6.
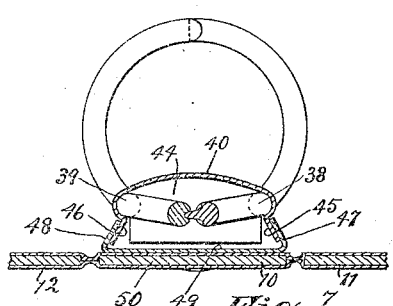
Fig. 7.
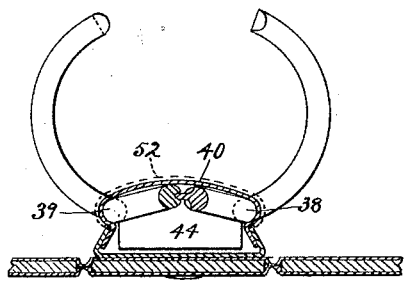
Fig. 8.
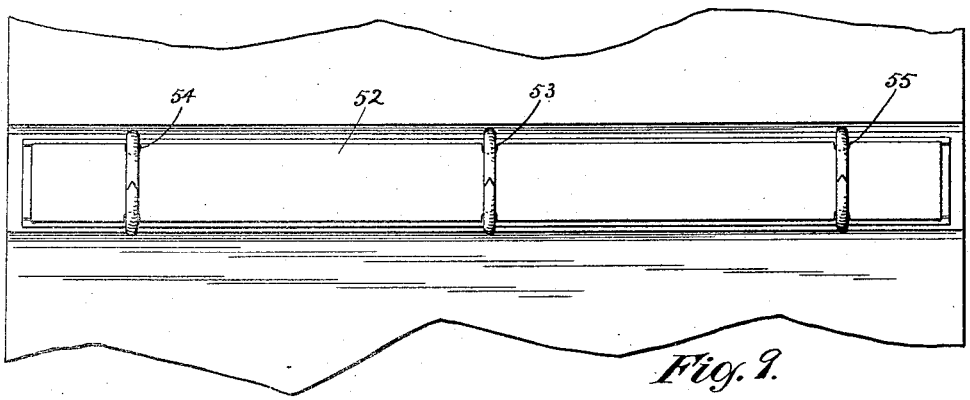
Fig. 9.
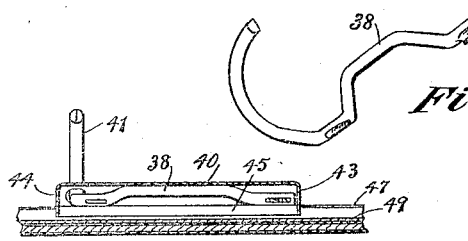
Fig. 10.  
Fig. 11.
Inventor:  
James C. Dawson  
By  
Attys Patented Sept. 23, 1924.

1,509,815

UNITED STATES PATENT OFFICE.

JAMES C. DAWSON, OF WEBSTER GROVES, MISSOURI, ASSIGNOR TO ELMA N. DAWSON, OF WEBSTER GROVES, MISSOURI.

LOOSE-LEAF BINDER.

Application filed March 8, 1923. Serial No. 623,690.

*To all whom it may concern:*

Be it known that I, JAMES C. DAWSON, a citizen of the United States, and resident of Webster Groves, county of St. Louis, and State of Missouri, have invented certain new and useful Improvements in Loose-Leaf Binders, of which the following is a specification, and which are illustrated in the accompanying drawings, forming a part thereof.

This invention relates to loose leaf binders, and has for its principal objects to maintain the paper-holding prongs in proper alignment in moving between open and closed positions; to provide binder units that may be readily adjusted to make the spacing thereof suit different conditions; and to provide a neat cover that will give the binder a finished appearance, and, when the adjustable units are used, will hold the units in the selected relation.

Further objects and advantages of the invention will become apparent as the description is read in connection with the accompanying drawings illustrating selected embodiments of the invention, and in which Fig. 1 is a plan view of a binder made according to the invention, with the backs broken away;

Fig. 6 is a view similar to Fig. 1, showing a modified form in which the paper-holding prongs are carried by separate units that may be adjusted to change the spacing;

Figs. 7 and 8 are sectional views similar to Figs. 2 and 3, and showing the prongs in closed and open position, respectively;

Fig. 9 is a plan view similar to Fig. 4, showing a cover plate holding three prong units in proper relation;

Fig. 10 is a perspective view of one of the bars used in the modified form; and

Fig. 11 is a sectional view taken on the line 11—11 of Fig. 6.

Figure 1:
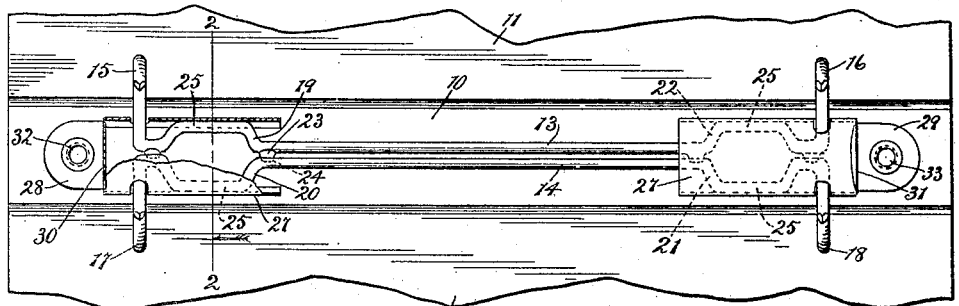

Referring to Fig. 1 of the drawing, 10 indicates a back plate to which the backs 11 and 12 are suitably articulated. Two bars 13 and 14 lie substantially parallel, as shown in the drawings, and carry at their opposite ends the cooperating pairs of prongs 15, 16, and 17, 18. Adjacent to the prongs the bars are bent to form short rigid arches 19, 20, 21 and 22. The spring portions of the arches of corresponding ends of the bars are loosely articulated by tongues 23, received in complemental grooves 24. The crown portions 25 of the arches may be flattened or formed of straight bar lengths, and are mounted in the curved flanges 26 of spring clips 27. The mounting of the crown portions 25 in the flanges 26 is such as to form suitable bearings within which the bars may rotate.

Figure 2:
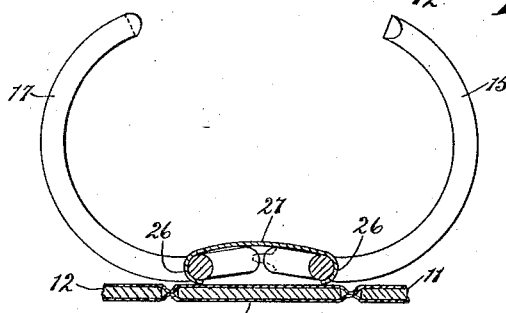
Fig. 2 is a sectional view taken on the line 2—2 of Fig. 1.
Figure 3:
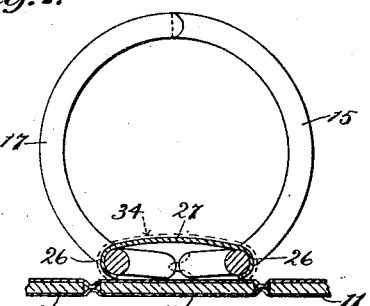
Fig. 3 is a similar sectional view showing the prongs closed in contrast with the open position shown in Fig. 2.

By this construction the arches form toggles which may be thrown past center to open or close the prongs 15, 17, and 16, 18, in unison, as will be clear from Figs. 1, 2 and 3. By making the arches close to the prongs and making them short, they become sufficiently rigid to hold the prongs always in alignment, whether in open or closed position, or in moving between those positions. The necessary resilience is provided by the spring clips 27 which easily furnish the action required to make the prongs snap into position after the toggles have been moved beyond center in either opening or closing. The intermediate portion of the bars serves to cause the prongs at opposite ends to open and close together.

The spring clips 27 are preferably provided with flanges 28 and 29, bent to form neat closures 30, 31, for the ends of the clips, and tabs by which the clips may be riveted or otherwise secured to the back plate, as indicated at 32 and 33.

Figure 4:
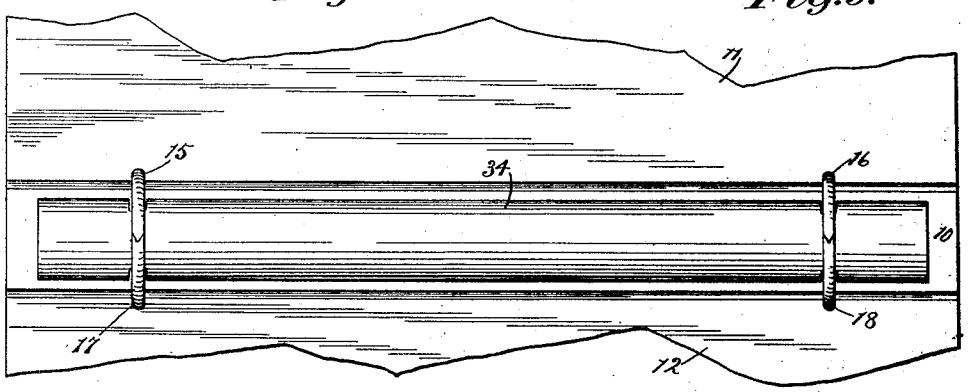
Fig. 4 is a view similar to Fig. 1 but showing a finishing cover applied.
Figure 5:
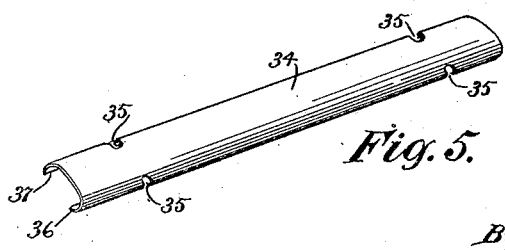
Fig. 5 is a perspective view of one form of cover.

For the cheaper grades of binders the construction shown in Fig. 1 may be sold without any cover, but for the higher priced and better grades of binders it will be preferable to supply a cover 34, shown in perspective in Fig. 5, and shown in place over the spring clips and the bars in Fig. 4. Suitable notches 35 are cut in the cover to receive the prongs, and flanges 36 and 37 are shaped to spring into position over the bearing portions 26 of the spring clips. The cover can easily be sprung into place and pried out of place.

On sheet 2 is shown a modified construction in which the prongs are carried by binder units that may be adjusted toward and away from each other to make the spacing suit particular requirements and to permit the assembly of any desired number of units in a book. In this construction each unit includes bars 38 and 39, provided with arches similar to those before described, and mounted in spring clips 40, similar to the clips 27. The bars, however, are cut away at the end of the arches opposite the prongs 41 and 42, and the clips are provided with stops 43, 44, preferably bent from the ends thereof, as indicated in Fig. 11, to provide neat closures for the clips and to prevent disassembly of the units.

The spring clips are also provided with flanges 45 and 46, flaring outwardly to form in effect a dovetail tongue adapted to be received between the converging flanges 47 and 48, carried by a clip plate 49 secured to the back plate 50 of the binder back by rivets 51 or other suitable fastening devices. This connection between the binder units and the back permits the prongs to be set at any particular distance apart that may be required for a special sheet, and it permits the spacing of the rings to be altered so that the binder may receive different sheets at different times with the same facility.

In Fig. 9 is shown a binder including three adjustable units, and a cover plate 52 for holding them in selected relation and giving the binder a finished appearance. This construction permits the manufacturer to keep on hand a stock of units and backs and quickly assemble binders to suit the particular spacing required by the individual purchaser, the only element that may require special alteration or manufacture being the cover 52, which may be kept in stock with selected notches 53, 54, and 55 therein, or may be notched to suit the particular conditions.

This unit construction has the rigidity of the bars described in connection with the form shown on sheet 1, and thus holds the prongs always in alignment, the necessary spring being furnished by the clips 40.

Both forms of binder shown are easily manufactured by automatic machinery and require very little hand work in assembling or finishing. They can, therefore, be made cheaply and at the same time will be durable and serviceable in use.

I claim as my invention—

1. In a loose leaf binder, the combination of a pair of short rigid arches with the crown portions thereof lying in spaced relation and the spring portions engaged to form a toggle joint, a spring clip in which the crown portions are rotatably mounted, and curved paper-holding prongs projecting from one spring portion only of each arch.

2. In a loose leaf binder, the combination of a pair of rods, each having its end portions bent to form a short rigid arch having a flat crown portion and a paper-holding prong projecting from the outer spring portion, a spring clip having marginal bearings in which the flat crown portions of the arches are rotatably mounted and means for articulating the spring portions of the arches to form a toggle joint.

3. In a loose leaf binder, the combination of a spring clip having marginal bearing portions, two rigid arch-shaped toggle bars having their spring portions in pivotal cooperation and their crown portions mounted in said marginal bearing portions, paper-holding prongs carried by said bars, and a stop on the clip adjacent to the ends of the rods opposite to the paper holding prong.

4. In a loose leaf binder, the combination of a back plate, a plurality of prong-carrying units slidably mounted on the back plate, and a cover plate holding said units in proper relation.

5. In a loose leaf binder, the combination of a pair of bars each formed into a short rigid arch and a paper-holding prong extending laterally adjacent to one end of said arch and adapted to form a toggle, and means for resiliently retaining said prongs in open or closed position through the action of said toggle.

JAMES C. DAWSON.